Nov. 11, 1941.   W. M. NASH   2,262,112
SHAFT BACK COLLAR
Filed Jan. 17, 1940   2 Sheets-Sheet 1
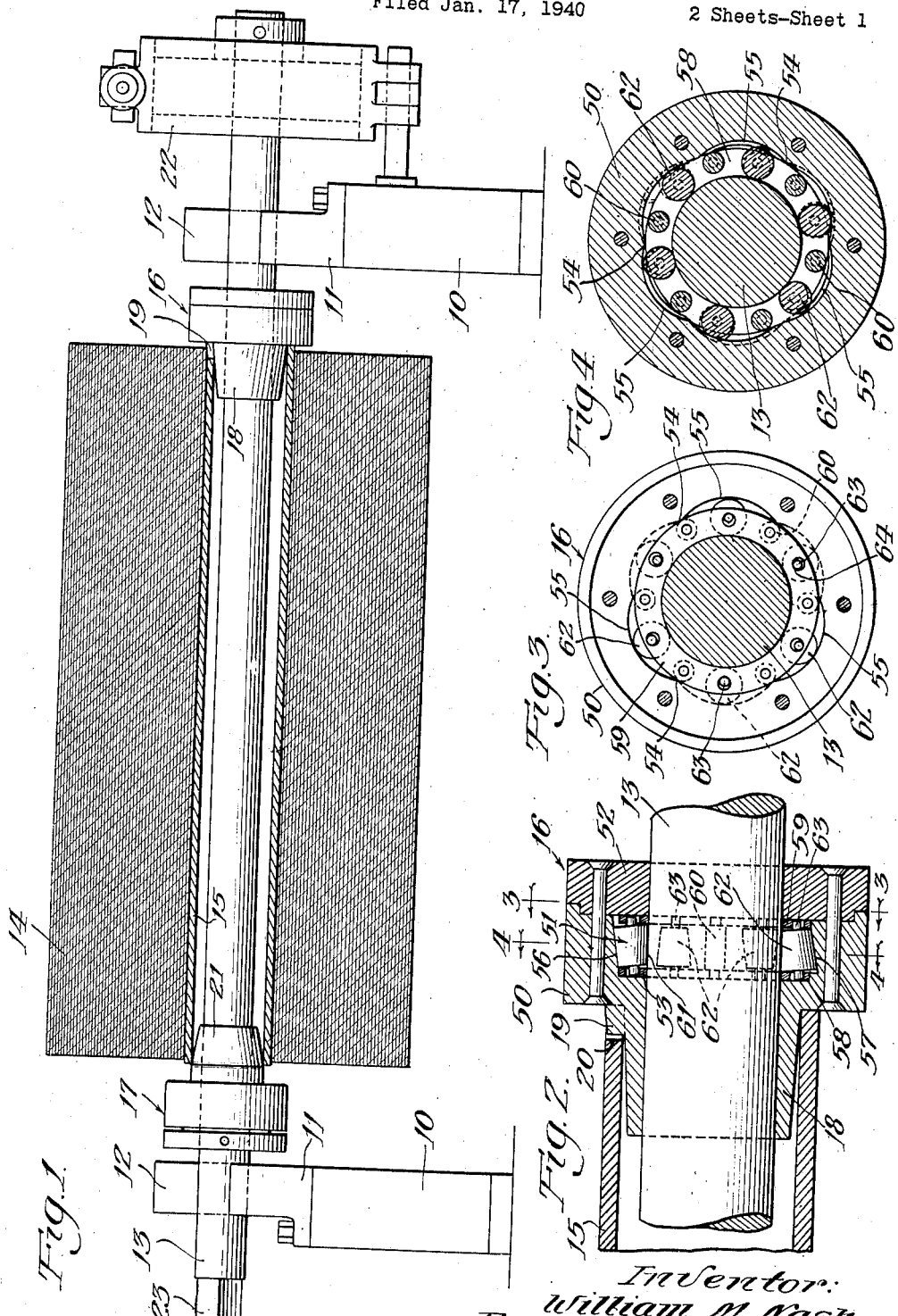
Inventor:
William M. Nash,
By: Lee J. Gary
Attorney.

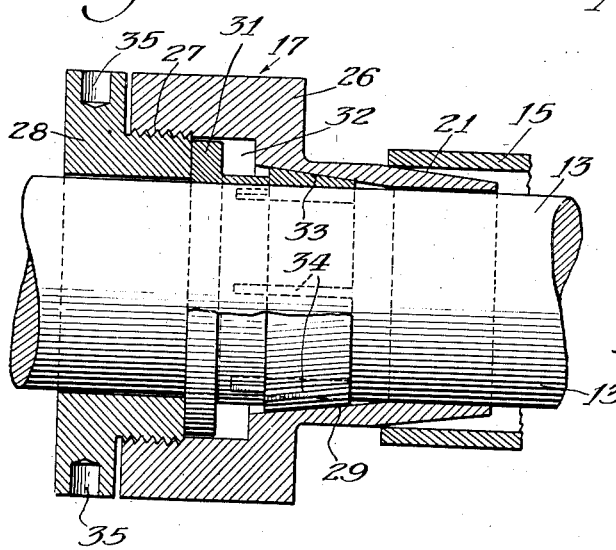
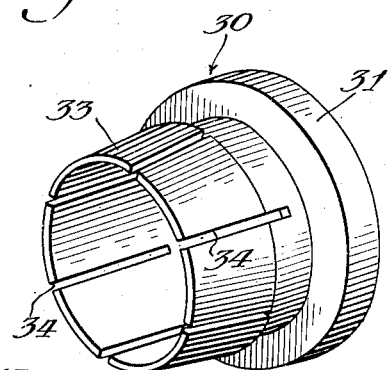
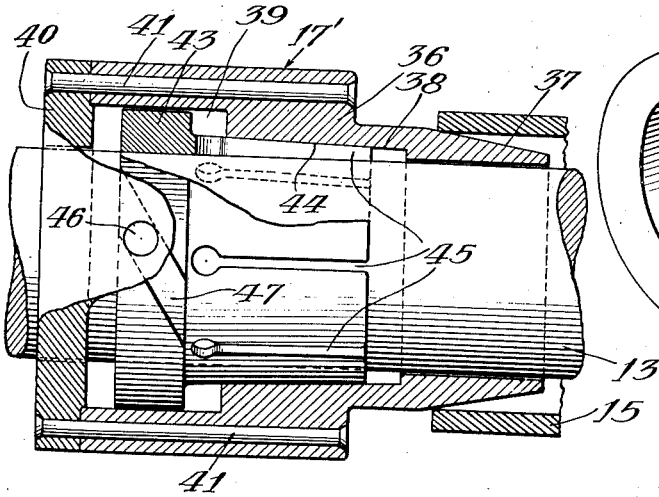
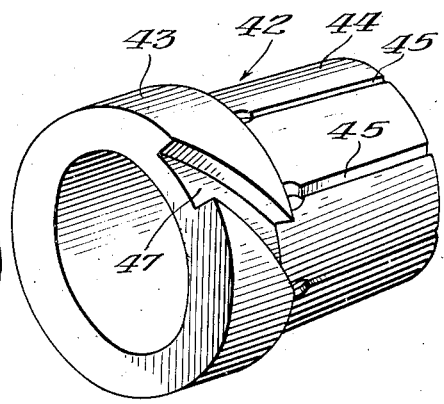

Patented Nov. 11, 1941

2,262,112

UNITED STATES PATENT OFFICE 2,262,112

SHAFT BACK COLLAR

William M. Nash, Menasha, Wis., assignor of one-fourth to Roy A. Nash, Bronxville, N. Y., and one-fourth to Mary Nash Jones and one-fourth to Marie Duvall Nash, both of Neenah, Wis.

Application January 17, 1940, Serial No. 314,207

1 Claim. (Cl. 287—52)

This invention relates to improvements in shaft collars and particularly to a safety chuck which may be locked onto the shaft for rotation therewith in either direction without the use of set screws, keys and the like.

More specifically this invention relates to a back side safety chuck or collar as distinguished from a driving collar, and is particularly suitable for use in combination with the automatic safety driving collar disclosed in my co-pending application Serial No. 245,611, filed December 14, 1938.

It is frequently required, in many operations, particularly in the winding or unwinding of continuous paper webs, to secure a collar upon a shaft and maintain said collar against rotary motion relative to the shaft. Collars for this purpose have heretofore been provided with keys and keyways or set screws whereby the necessary rigid relationship between the shaft and collar may be obtained.

In using keys, the shaft must be provided with keyways which, of course, increase the cost of the shaft. In addition it involves considerable time and labor to properly set the collars upon the shaft. In using set screws, which has heretofore been the accepted practice, the shafts have so gouged as to require the shaft to be frequently dressed. In addition, the heads of the set screws present rotating projections upon which clothing may be caught, endangering workmen. Further, it is necessary to use a wrench to tighten and loosen the set screws which involves time and labor.

In my present invention a back collar is provided which has none of the disadvantages heretofore described in conjunction with keyed collars or collars secured by set screws, and is further free of any projecting objects or portions so that it may be classified as a safety chuck. It is only necessary when disposing the back collar in operative position upon the shaft to slide it over the end of the shaft to the desired position and to bring the chuck housing into wedging engagement with an internally positioned or contained collet whereby the collet causes the assembly to be locked to the shaft, the locking taking place over a relatively large area of the shaft surface thereby eliminating local pressure and, hence, gouging of the shaft.

In general my back collar or safety chuck comprises a housing having an internal tapered surface portion and having nested within its chamber a slotted collet, the collet having a tapered outer surface portion complementary to the housing taper, and whereby relative movement of the two portions toward each other causes the collet to become tightly frictionally locked against the shaft by means of wedging action. The housing is provided with an outer end closure which is, however, free of engagement with the collet, and its inner end is formed with a neck adapted to extend within a mandrel or the like carried on the shaft, but without engagement means, so that a carried mandrel, tube, or the like, is freely rotatable upon the neck of the unit, and is thus particularly suitable for use in combination with the drive collar of my aforesaid copending application.

Other objects and advantages will be apparent from a consideration of the following specification and drawings, wherein:

Fig. 1 is a front elevational view of a shaft carrying a roll, shown in section, upon which is mounted a back collar in accordance with this invention, and a drive collar.

Figs. 2 to 4 are detail sectional views of one form of driving collar indicated at 16 in Fig. 1, as more particularly disclosed in my aforesaid copending application Serial No. 245,611, Fig. 2 being a longitudinal section taken on the line 2—2 of Fig. 3, a fragmentary portion of the shaft being shown in elevation; Fig. 3 being a transverse sectional view taken on the line 3—3 of Fig. 2; and Fig. 4 being a transverse sectional view taken on the line 4—4 of Fig. 2.

Fig. 5 is a longitudinal section of the back collar of the present invention indicated at 17 in Fig. 1, a fragmentary portion of the shaft, and a fragmentary portion of the collet being shown in elevation.

Fig. 6 is a perspective view of the collet shown in Fig. 5.

Fig. 7 is a view similar to Fig. 5 of a modification of my invention.

Fig. 8 is a perspective view of the collet embodied in the modification of Fig. 7.

My invention will be specifically described in conjunction with a winding or rewinding device used in the paper making industry, and particularly as used in association with a drive collar of the type set forth in my aforesaid copending application.

Referring to the drawings, the reference numerals 10, 10, indicate spaced standards or blocks upon which bearings 11, 11, are supported. The bearings are suitably of the open type having a high side 12 at the rear thereof. A shaft 13 is journaled adjacent each end in the bearings 11 and is adapted to carry a roll of paper 14 which has previously been wound on a tube or mandrel

15. A drive collar 16, preferably as disclosed in my aforesaid copending application is mounted at one end of the tube, and a back collar 17 comprising my present invention is mounted on the opposed end of the tube 15. Drive collar 16 is formed with an inwardly extending neck portion 18 protruding into the end of the tube to support it at the drive end and is provided with a key 19 which engages into the keyway or slot 20 provided at one end of the tube. The back collar 17 is formed with a similar neck portion 21 protruding into the end of the tube to support it at its end, but is free of keys or other tube engaging means, so that the tube or mandrel 15 is free to rotate with respect to the back collar 17, and is thus particularly suitable for operative use with automatic locking drive collar 16, as will be hereinafter more particularly set forth.

The roll 14 comprises a continuous web of paper and for purposes of illustration it will be assumed that the web is to be rewound upon another mandrel or tube (not shown). Of course, in so far as my invention is concerned, the collars can be used on the tube 15 when the shaft 13 is driven to wind the web upon the tube 15. However, with the assumption that the roll 14 is being unwound, it is essential in this operation that the shaft 13 be prevented from spinning. To accomplish this function a friction mechanism 22 is associated with the shaft. The mechanism 22 comprises no part of my invention and is well known in the art and will not be described in detail.

The automatic locking shaft drive collar 16 of my copending application, one form of which is shown in detail in Figs. 2, 3 and 4, comprises in general means for interlockingly engaging a tube or mandrel carried by a shaft and means for engagement with the shaft through relative rotary motion of the collar housing with respect to the shaft.

Referring particularly to Figs. 2, 3 and 4, the collar 16 comprises a housing 50 having a tapered neck or extension 18; a roller assembly 51 and a closure plate 52. The collar 16 is adapted to be mounted on shaft 13 and is further adapted to serve as a locking medium between said shaft and the tube or mandrel 15, by means of the key 19 and keyway 20. The housing 50 is provided with a recess 53, the circumferential contour of the defining walls of the recess being undulated or scalloped to form a plurality of adjacent crests 54 and troughs 55. In addition to the lateral defining walls of the recess 53 being undulated, the walls of said troughs are tapered in a direction parallel to the axis of the shaft 13. The arrangement is such that the walls of adjacent troughs are tapered in opposite directions, as at 56 and 57.

The roller assembly 51 comprises a pair of annular rings 58 and 59 which are attached to, and maintained in separate relationship by spacers 60. Interspersed between the spacers around the circumference of the rings are rollers 61 and 62 which are carried by shafts 63 which, in turn, are journaled in apertures 64 provided in the rings 58 and 59 whereby the rollers are freely rotatable. The apertures 64 are larger than the shafts 63 whereby said shafts have a degree of lateral freedom of movement, the purpose of which being hereinafter described.

Both rollers 61 and 62 are tapered, that is, are frusto-conical. However, throughout the circumference of the rings the rollers are alternated, that is, a roller 61 is disposed between two rollers 62, and each roller 62 is disposed between two rollers 61, etc. The roller assembly embraces the shaft 13 and is adapted to be positioned within the recess 53, the arrangement being such that the taper of the rollers conforms, more or less, with the longitudinal taper of the walls of the recess.

In practice, the degree of taper of the rollers 61 and 62 is relatively small, being in the neighborhood of about one degree. However, for purposes of clarity of description the taper is exaggerated in the drawings. It is intended that the rollers 61 and 62 make osculating line contact with the shaft surface. Hence, by the provision of the enlarged bearing apertures 64, the axes of the rollers may be canted. Likewise, the taper of the walls of the recess 53 is approximately twice the degree of taper of the rolls so that the rollers may assume the required canted position.

The closure 52 may be positioned on the mouth of the housing and secured thereto by means of screws or the like whereby the roller assembly 51 is confined in the recess 53. It is to be understood that the collar need not be assembled on the shaft since it is possible to assemble the collar as a stock unit and mount the same on, and remove the same as a unit from the shaft.

In operation, rotary movement of the housing relative to the shaft or vice versa results in the locking of the rollers adjacent the crests 54. However, when said rollers are thus locked, longitudinal movement of the collar in either direction upon the shaft is also prevented since one-half of the tapered rollers wedge against the respective tapered walls of the recess 53 when a force is applied in a predetermined longitudinal direction. However, when the collar is backed up the rolls move into the troughs 55 and the collar may be conveniently slid longitudinally of the shaft. Engagement may be brought about by rotating the roll 14 relative to the shaft 13, or conversely as soon as the shaft is rotated relative to the roll, as for instance by applying a wrench to the square end 23 of the shaft, the housing 50 or the shaft 13 moves relative to the roller assembly until the rollers bind between the crests of the scalloped housing and the shaft surface. In Fig. 4 the locked position is shown when the collar housing is moved counter clockwise with respect to the shaft. To remove the collars it is merely necessary to relieve this binding tension by moving the shaft 13 or roll 14 in the opposite direction until the rollers occupy the position shown in Fig. 3.

For the purpose of utilizing an automatically locking driving collar of the class set forth in Figs. 2 to 4 requiring rotation of a part of a revolution to cause the rollers to lock and to insure maximum locking efficiency, it is desirable that a back collar be provided which will permit freedom of such partial rotation of either the shaft 13 or the roll 14 and tube 15 and without effecting the locking or positioning of the back collar on the shaft. For such purpose I have now provided the back collar 17 which is free of means for keying it to the tube 15, the tube 15 merely resting on the neck portion 21 and being freely revolvable thereon, so that rotative locking of the drive collar 16 may be independently carried out, preferably after the back collar 17 has been positioned on the shaft and in supporting engagement with the tube 15. Likewise in order to be further independent of the rotation locking movement of the collar 17; to be free of projections or protrusions so that it may come within the class of safety chucks; so that it will not gouge and require frequent dressing of the shaft; and to provide a back collar which can be positioned rapidly and with a minimum expenditure of labor I have devised a back collar 17, the preferred form of which is illustrated in detail in Figs. 5 and 6.

The back collar of Figs. 5 and 6 comprises a housing 26 provided with thread 27 adjacent one end thereof for threadedly engaging the bushing 28. The internal diameter of the neck portion 21 of the housing is slightly greater than the diameter of the shaft 13 for which it is adapted, so that it is free of shaft binding engagement. Intermediate of its length the housing is formed with an inner tapered or conical surface 29 for the reception of a collet 30. The collet is of an internal diameter substantially that of shaft 13 and is provided with a flange 31 at one end for abutment against the bushing 28 and slidable in the chamber 32. The opposed end of the collet is formed with a tapered or conical outer face 33 complementary to the tapered surface 29 so that it may nest therein. Additionally the collet is formed with a number of spaced apart longitudinal slots 34 extending from the tapered end to substantially the flange 31 to form a plurality of clamping jaws.

The back collar 17 may be positioned on the shaft 13 after a roll 14 and tube 15 are mounted thereon and the neck of the collar inserted into the tube, preferably before the drive collar 16 is rotatably locked onto the shaft 13 and keyed to the tube 15. The back collar 17 may be slid along the shaft 13 to position preferably as a loosely assembled unit, and thereafter the bushing 28 screwed further into the housing 26 and against the collet flange 31 to wedge the jaws of the collet into frictional contact with the shaft 13. The bushing 28 may be tightened by means of a wrench or by suitable tools or handles inserted into sockets 35. It will also be apparent from the described construction and operation that by reason of the wedge gripping arrangement any endwise movement of the tube 15 and roll 14 in the direction of the back collar will tend to cause the housing to become more securely engaged over the tapered collet and thus enhance its gripping action and prevent slipping of the unit 17 upon the shaft 13.

In Figs. 7 and 8 I have shown a modified back collar generally indicated as 17' embodying a collet of modified construction shown in Fig. 8. This form of unit comprises a housing 35 having a neck portion 36 adapted for insertion into tube or mandrel, the neck having an internal diameter slightly larger than the shaft 13. Intermediate its length the housing 36 is provided with a tapered or conical internal surface area 38 and at its enlarged end with a chamber 39, the said end being closed by the cover 40 retained against the housing 36 by means of screws 41, bolts or the like. Contained within the housing 36 is the collet 42 formed with a flange or collar 43 at one end slidable within the chamber 39, and a tapered or conical external surface area 44 at its opposed end, the taper being reciprocal to the taper 38 and nestable therein. The collet 42 is further provided with longitudinal slots 45 extending from its tapered end to adjacent the collar 43 to form a plurality of clamping jaws which act to frictionally engage the shaft 13 when the housing and its tapered surface 38 is wedged therewith, all in a manner similar to the construction of the collet 30 and housing 26 of Figs. 5 and 6. In this modified construction, however, a pin 46 extends inwardly from the inner face of the housing in its chamber portion 39 and into the oblique slot 47 formed in the collar 43. This form of back collar unit is adapted to be positioned on and engaged to the shaft without the requirement of tools and may be slid onto the shaft to approximate position and then by a rearward movement of the housing 36 the tapered and slotted portion of the collet is caused to become wedged and the jaws clamped into engagement with the shaft. While I have shown the slot 47 extending in a single direction, it will be appreciated that, although not shown, collets may be provided with slots extending obliquely in the direction opposed to that of Figs. 7 and 8 and a collet of appropriate directional slot will be utilized in accordance with the subsequent operative rotation of shaft 13, such as for example, in a paper winding or unwinding operation. In setting the back collar the rearward movement will therefore be accompanied by a slight twisting movement which will tend to move the housing and collet in opposed directions towards each other and enhance the gripping action. The prime purpose of the pin and slot arrangement, however, is to facilitate release of the clamping action in the closed unitary construction. Thus at the end of the operation such as winding or unwinding, a slight rotative movement of the shaft, which may be the same rotative movement required for unlocking the drive collar 16, will cause the pin 46 to bear against the side of slot 47 and bring about relative movement of the collet 42 and housing 36 in opposed directions away from each other and thus release the wedging and gripping action.

Although not shown, it will be apparent that a collet of the type shown in Fig. 6 may be enclosed in a housing of the type shown in Fig. 7 free of pin 46 and engagement brought about by a rearward movement of the housing on the shaft and disengagement by a forward movement.

I claim as my invention:

A shaft collar of the class described comprising a chambered housing adapted to removably embrace a shaft, a neck portion extending from one end thereof adapted to rotatably support one end of a mandrel, a closure member for the opposed end of said chambered housing, and a collet contained and longitudinally movable to a limited relative degree within said chamber, a defining wall area of said chamber being tapered towards said neck portion and said collet being formed with a complementary tapered exterior and provided with longitudinal slots extending from its smaller end and formed with an annular collar at its large end, the said collet and the said housing being adapted to be moved relative to each other on said shaft and to thereby wedge said collet into frictional engagement with said shaft upon relative movement of said elements towards each other, and means extending from the defining wall of said housing into means formed in said collar adapted to move the housing and collet out of relative engagement with each other by relative rotary movement.

WILLIAM M. NASH.